C. Wheeler Jr.
Mower.
No 880 Reissued Jan. 3, 1860.
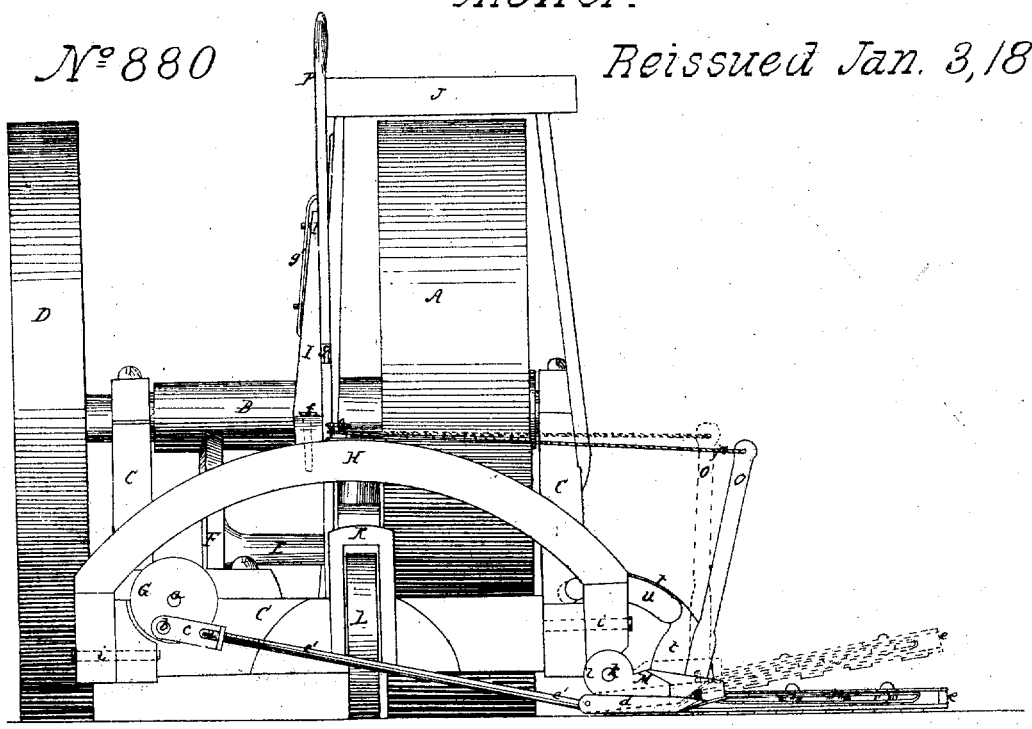
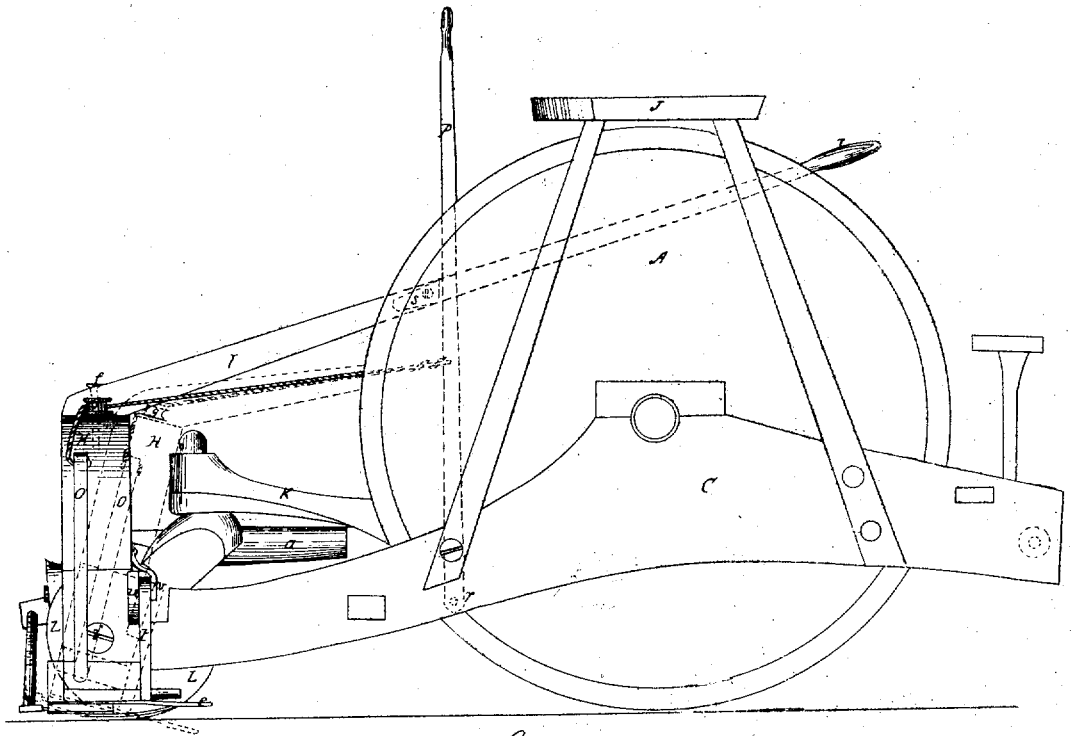
Witnesses.
Thos. A. Uppenman
E. Cohen
Cyrenus Wheeler Jr

C. Wheeler Jr.

Mower.

No 880 Reissued Jan. 3, 1860.

Witnesses:
Thos. A. Uffenman
S. Cohen

Cyrenus Wheeler Jr

UNITED STATES PATENT OFFICE.

CYRENUS WHEELER, JR., OF POPLAR RIDGE, NEW YORK.

IMPROVEMENT IN GRAIN AND GRASS HARVESTERS.

Specification forming part of Letters Patent No. 12,044, dated December 5, 1854; Reissue No. 880, dated January 3, 1860.

DIVISION F.

*To all whom it may concern:*

Be it known that I, CYRENUS WHEELER, Jr., of Poplar Ridge, in the county of Cayuga and State of New York, have invented certain new and useful Improvements in Grain and Grass Harvesters; and I do hereby declare the following to be a full, clear, and exact description of the construction and operation of the same, reference being had to the accompanying drawings, making a part of this specification, in which—

Figure 5:
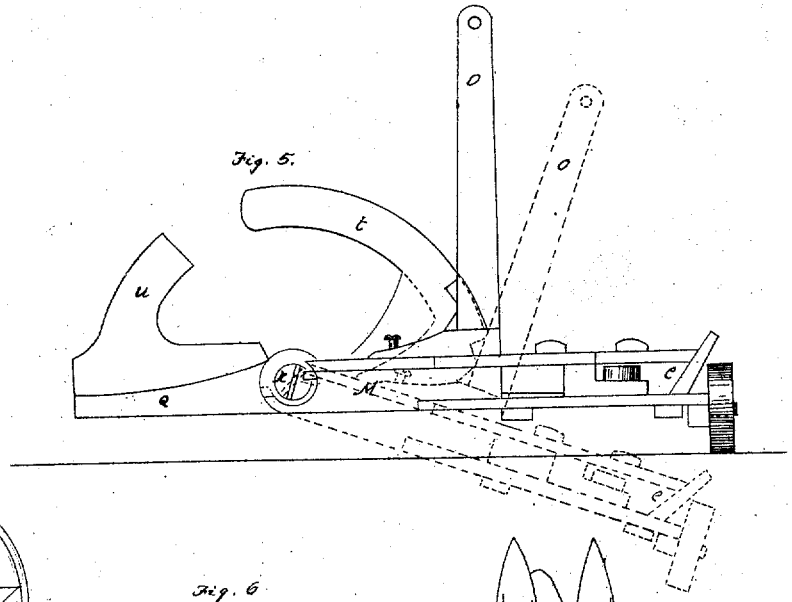
Figure 3:
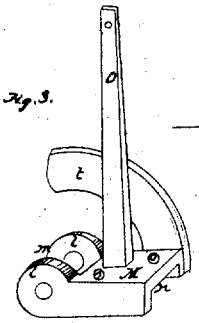
Figure 6:
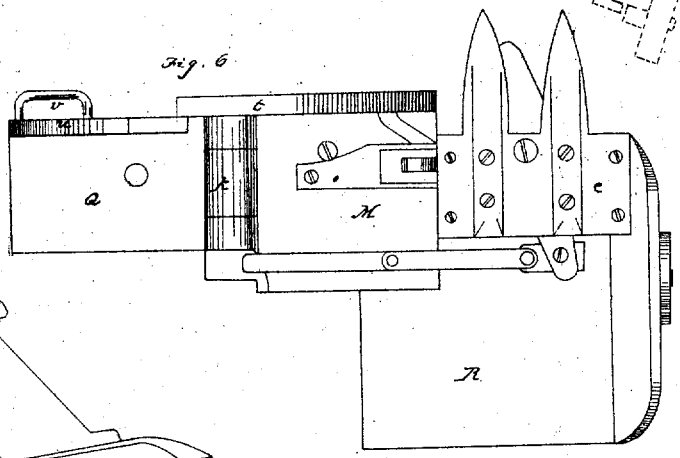
Figure 4:
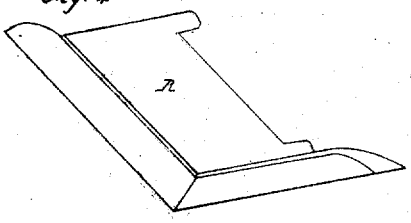
Figure 7:
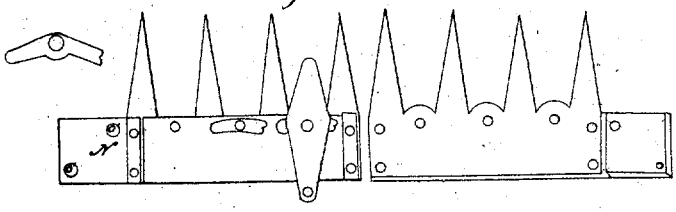

Figure 1 represents a rear elevation of a grass-harvester. Fig. 2 represents an elevation of the same from that side of the machine that runs next the standing grass or grain. Figs. 3 and 4 represent detached portions of the machine. Figs. 5 and 6 represent on an enlarged scale, respectively, a rear elevation and a plan of the finger-bar and the shoe or piece to which it is hinged. Fig. 7 represents a cutting apparatus.

Similar letters of reference, where they occur in the several figures, denote like parts of the machine in all of them.

For the purposes of transportation, or for passing through gates, bars, or narrow lanes, it is desirable that the cutter-bar, which projects beyond the main frame of the machine, should be susceptible of being folded up to and supported by the main frame, so as to contract the width of the machine, and thus allow it to go through narrow passages without danger of striking.

To effect this purpose is the object of this invention; and the invention consists in so hinging or connecting a finger-bar to or with the main frame of a grass-harvester as that the former may be folded up to and carried at the side of the main frame, as herein described, when the machine is to be transported from place to place.

To enable others skilled in the art to make and use this invention, I will proceed to describe the same with reference to the drawings.

A represents a main supporting and driving wheel fast on and turning with the axle B, and D is an auxiliary supporting-wheel.

C is the main frame of the machine, supported on the axle B in any of the usual well-known ways.

To the grain side of the main frame is hinged a piece, M, to which the finger-bar is bolted. This hinge-joint, as seen at *k*, is outside of the main frame, so that in folding the finger-bar it will swing clear of the main frame until it comes against it, in which position it may be held by the cord or chain and lever used for controlling said finger-bar when it is down in position for mowing. In the drawings the piece M is represented as hinged to an arm, brace, or support, H, that extends from the side of the machine opposite to where the hinge-joint *k* is; but this does not affect the hinge *k*, or, rather, the location of the hinge *k*, for it is its location clear of the main frame that admits of the folding of the cutter-bar so far as to come against the main frame. If the hinge were anywhere under the main frame, of course the extent to which the finger-bar could be raised would be limited; but by placing the hinge on which it plays outside of or clear of the main frame the finger-bar can be folded up against the main frame, and be secured and carried there while the machine is being transported from field to field or place to place of operation, as follows: Disconnect the lever I from the piece H by removing its fastening, and lift the cord or chain *p* from its pulley *g*. The piece H is then free to swing back of the frame. The cutter-bar can then be swung or folded against the side piece, C, and be fastened there, where it is entirely out of the way of any intervening object, contracting the width of the machine to that of but little greater than the width of the frame itself, or, as the cutter-bar is longer than the width of the frame, reducing the width of their united occupying space, when spread out, materially; and as I use a caster-wheel, L, at the rear of the frame for supporting it and preventing it from dragging too heavily on the ground, the thus folding up of the cutter-bar, so as to be entirely supported and carried by the main frame, in no wise tends to tip up the frame at its opposite end by the additional weight thus put upon it or to throw it out of balance. I thus, when transporting the machine from place to place of operation, carry the cutter and finger-bar resting at the side of the main frame, and am thus able to take it through much narrower spaces, as I contract the working width of the machine materially, and at the same time carry the cutter-bar at the side of the main frame, and not resting upon the ground. That this folding up may be done without disconnecting the pitman is essential, for otherwise it would occupy too much time. To enable it to do so the length of the pitman from *b* to where it unites with the cutter-bar *d* and forms a hinge should be equal, or very nearly so, to the distance between *a* and *k*, and when so they will fold up together without disconnecting the pitman.

Having thus fully described the nature and object of my invention, what I claim under this patent is—

The use of two hinges, substantially as described, whereby the finger-beam may be folded to the main frame in the manner essentially as set forth.

CYRENUS WHEELER, JR.

Witnesses:

THOS. H. UPPERMAN,

E. COHEN.